United States Patent [19]

Kamei et al.

[11] Patent Number: 4,992,332
[45] Date of Patent: Feb. 12, 1991

[54] POROUS HOLLOW FIBER

[75] Inventors: Eiichi Kamei; Yasushi Shimomura; Mitsuo Yamanaka, all of Hirakata, Japan

[73] Assignee: UBE Industries, Ltd., Ube, Japan

[21] Appl. No.: 346,278

[22] Filed: Apr. 27, 1989

Related U.S. Application Data

[63] Continuation of Ser. No. 10,863, Feb. 4, 1987, abandoned.

[30] Foreign Application Priority Data

| Feb. 4, 1986 | [JP] | Japan | 61-21312 |
| Apr. 8, 1986 | [JP] | Japan | 61-79321 |
| Jun. 11, 1986 | [JP] | Japan | 61-135573 |
| Sep. 9, 1986 | [JP] | Japan | 61-210540 |
| Sep. 9, 1986 | [JP] | Japan | 61-210541 |

[51] Int. Cl.$^5$ .............................................. D02G 3/00
[52] U.S. Cl. .................................. 428/398; 210/500.23; 428/375; 428/376; 428/400
[58] Field of Search ............... 428/376, 398, 375, 400; 210/500.23

[56] References Cited

U.S. PATENT DOCUMENTS

| 4,214,020 | 7/1980 | Ward et al. ....................... 427/296 |
| 4,654,265 | 3/1987 | Kamei et al. ...................... 428/398 |
| 4,670,341 | 6/1987 | Lundsager ..................... 428/398 X |

Primary Examiner—Lorraine T. Kendell
Attorney, Agent, or Firm—Frishauf, Holtz, Goodman & Woodward

[57] ABSTRACT

The improvement in a porous hollow fiber having a large number of micropores in its surrounding wall, in which walls of said pores are coated with an essentially water-insoluble alkylcellulose derivative such as ethylcellulose, carboxymethylethylcellulose, hydroxypropylmethylcellulose acetate succinate or hydroxypropylmethylcellulose phthalate, or poly(2-hydroxyethyl methacrylate).

7 Claims, 2 Drawing Sheets

POROUS HOLLOW FIBER

This application is a continuation, of application Ser. No. 07/010,863, filed Feb. 4, 1987, now abandoned.

BACKGROUND OF THE INVENTION

1. Field of the Invention

The present invention relates to a porous hollow fiber which is suitable for separation of substances contained in a fluid, particularly water, for the purpose of purification thereof. More particularly, this invention relates to a porous hollow fiber which is prominently improved in hydrophilic nature and has a function of filtration in a wide range such as micro-filtration and ultrafiltration.

2. Description of Prior Art

A porous hollow fiber of a polymer material is used widely as a device for precise filtration and ultrafiltration of various substances. For example, it is used for separation and purification of water or aqueous solutions in arts of industrial fields and the clinical field.

In the case that the precise filtration or ultrafiltration of water or aqueous solutions is performed by using a porous hollow fiber or film, the porous hollow fiber or film needs to have hydrophilic nature. As a process of producing a porous hollow fiber or porous film having the hydrophilic nature, there is known a process which comprises the steps of dissolving a polymer material in an appropriate solvent mixture containing a volatile solvent and a swelling agent or poor solvent to prepare a homogeneous solution, casting the solution to form a film, then removing the volatile solvent partially or completely through evaporation, followed by further removing through extraction of the remaining non-solvent or swelling agent by immersing the film in a solidifying medium to form a large number of micropores in the film. This process is called, a phase transition process. Also known is a process comprising steps of preparing a porous film of a polymer material containing a soluble material dispersed therein and then removing said soluble material by dissolving it with an appropriate solvent to form a large number of micropores in the film. The above-described processes comprising removing the soluble material are referred to hereinafter as Conventional Process 1.

Recently, an alternative process using a hollow fiber or film of a thermoplastic resin such as high-density polyethylene, polypropylene and poly(4-methylpentene-1) has been proposed and now is used in practice. In this process, the hollow fiber or film which has been spun is heat-treated and then subjected to a drawing process at a temperature of specific range and/or in a specific medium to form pores in the surrounding wall of the fiber or in the film. The process is referred to hereinafter as Conventional Process 2. In this process, a porous hollow fiber or film having excellent mechanical properties can be obtained.

However, there are drawbacks in the above-mentioned conventional processes. For instance, the process for preparing a hollow fiber or film having hydrophilic nature according to Conventional Process 1 requires a complicated process as described hereinbefore, and as a result the manufacturing cost becomes high. On the other hand, since the porous hollow fiber or film prepared in Conventional Process 2 is hydrophobic, the resulting fiber or film needs to be subjected to a supplemental procedure for providing thereto hydrophilic nature by the use of alcohol or the like when the resulting fiber or film is to be used for filtration of water or aqueous solutions, and further needs to be kept in wet state. In this process, accordingly, it becomes complicated to control or maintain the resulting fiber or film under satisfactory conditions.

The present inventors studied to improve the abovedescribed conventional porous hollow fiber, and already found that a porous hollow fiber having a satisfactory hydrophilic nature for filtration of water or aqueous solutions and a function of filtration in the wide range such as precise filtration and ultrafiltration can be obtained by coating a conventional hollow fiber on the surfaces of its surrounding wall having a large number of micropores, particularly on the walls of the micropores, with ethylene-oxide grafted nylon such as nylon 6. The invention based on the above finding is described in U.S. patent application Ser. No. 870,709 which issued as U.S. Pat. No. 4,654,265.

SUMMARY OF THE INVENTION

The present inventors have further studied to improve the conventional porous hollow fiber, and found that a porous hollow fiber having satisfactory hydrophilic natures for filtration of water or aqueous solutions and satisfactory functions for filtration in the wide range such as precise filtration and ultrafiltration can be obtained by coating a conventional hollow fiber on the surfaces of its surrounding wall having a large number of micropores, particularly on the walls of the micropores, with other specific polymers.

Accordingly, there is provided by the present invention the improvement in a porous hollow fiber provided with a large number of micropores in the surrounding wall, in which walls of said pores are coated with an essentially water-insoluble alkylcellulose derivative such as ethylcellulose, carboxymethylethylcellulose, hydroxypropylmethylcellulose acetate succinate or hydroxypropylmethylcellulose phthalate, or poly(2-hydroxyethyl methacrylate).

In the porous hollow fiber of the present invention, outer and inner surfaces of the surrounding wall preferably are further coated with the specific coating polymer.

In the porous hollow fiber of the invention, at least one of outer and inner surfaces of the surrounding wall may be coated with a non-porous layer of the coating polymer.

In the porous hollow fiber of the invention the micropores in the surrounding wall may be filled up with the specific coating polymer.

The porous hollow fiber of the invention which is coated with the specific coating polymer on the walls of the micropores in the surrounding wall has a sufficient hydrophilic nature required for filtration of substances such as water and aqueous solutions. Further, the porous hollow fiber of the invention is appropriately employable for a wide range of filtration and separation such as precise filtration or ultrafiltration by appropriately adjusting or varying the coating conditions of the coating polymer. In addition, it is possible to provide satisfactory hydrophilic nature to the porous hollow fiber of the invention through a simple procedure, as compared with the conventional process for the preparation of a porous hollow fiber having hydrophilic nature.

Figure 3:
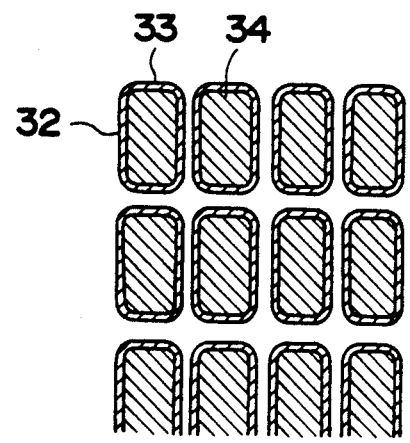
Figure 4:
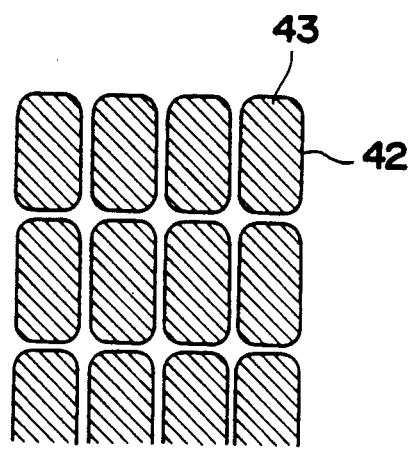

Each of FIGS. 3 and 4 is an enlarged view of the area (marked with X in FIG. 1) on the outer surface of the sorrounding wall of other example of the porous hollow fiber according to the present invention.

DETAILED DESCRIPTION OF THE INVENTION

The porous hollow fiber of the invention will be described in detail below.

There is no specific limitation on the material of the porous hollow fiber of the invention having a large number of micropores in its surrounding wall. Examples of the materials include polymer materials such as polyolefins (e.g., high-density polyethylene, polypropylene, and poly(4-methylpentene-1)); fluorine-containing polymer compounds, polysulfone, polycarbonate or polyvinyl chloride; and inorganic materials such as glass, ceramics and carbonaceous material. Likewise, there is no specific limitation on the outer diameter of the porous hollow fiber, the thickness of the surrounding wall, and the pore size of the micropores in the surrounding wall. Generally, the outer diameter of the fiber is in the range of 10–1,000 $\mu$m, the thickness of the surrounding wall is in the range of 10–500 $\mu$m, and the pore size of micropores is in the range of 0.01–50 $\mu$m.

The coating polymer employable in the invention is selected from the group consisting of ethylcellulose, carboxymethylethylcellulose, hydroxypropylmethylcellulose acetate succinate, hydroxypropylmethylcellulose phthalate, and poly(2-hydroxyethyl methacrylate).

The ethylcellulose preferably employable in the invention is one which shows a viscosity in the range of 4–100 cps, more preferably 4–10 cps, at 25° C. in a solution of a mixture of 80 vol.% of toluene and 20 vol.% of ethanol containing said ethylcellulose at concentration of 5 wt.% and has an ethoxy group content in the range 45–50%.

The ethylcellulose is preferably employed in the form of a solution in an organic or aqueous organic solvent such as acetone, acetone-water, an alcohol such as methanol or ethanol, alcohol-water, benzene, toluene, xylene or chloroform. The solution advantageously contains the ethylcellulose at a concentration of 0.1 to 5 wt.%.

The carboxymethylethylcellulose preferably employed in the invention is one which contains 8.9–14.9 wt.% of carboxymethyl group and 32.5–43.0 wt.% of ethoxyl group.

The carboxymethylethylcellulose is preferably employed in the form of a solution in an organic or aqueous organic solvent. From the viewpoint of the solubility of the cellulosic polymer and its permeability into the porous fiber, a mixed solvent such as ethanol-water, methylene chloride-ethanol, or ethyl acetate-ethanol. The solution advantageously contains the carboxymethylethylcellulose at a concentration of 0.05 to 10 wt.%, more advantageously from 0.1 to 0.5 wt.%.

The hydroxypropylmethylcellulose acetate succinate preferably employed in the invention has substituents comprising 12–28 mol.% of methoxyl group, 4–23 mol.% of hydroxypropoxyl group, 2–16 mol.% of acetyl group and 4–28 mol.% of succinoyl group.

The hydroxypropylmethylcellulose acetate succinate is preferably employed in the form of a solution in an organic or aqueous organic solvent such as acetone, acetone-water, an alcohol such as methanol, ethanol or isopropanol, or alcohol-water. The solution advantageously contains the cellulose derivative at a concentration of 0.05 to 5 wt.%, more advantageously from 0.2 to 1 wt.%.

The hydroxypropylmethylcellulose phthalate preferably employed has substituents comprising 18–24 mol.% of methoxyl group, 5–10 mol.% of hydroxypropoxyl group, and 21–35 mol.% of carboxybenzoyl group.

The hydroxypropylmethylcellulose phthalate is preferably employed in the form of a solution in an organic or aqueous organic solvent such as acetone, acetone-water, an alcohol such as methanol, ethanol or isopropanol, or alcohol-water. The solution advantageously contains the cellulose derivative at a concentration of 0.05 to 10 wt.%, more advantageously from 0.2 to 3 wt.%.

The poly(2-hydroxyethyl methacrylate) is preferably employed in the form of a solution in an organic solvent such as methanol. The solution advantageously contains the polymer at a concentration of 0.05 to 7 wt.%, more advantageously from 0.1 to 5 wt.%.

The porous hollow fiber of the invention can be prepared by the following process.

In the first place, a porous hollow fiber is dipped in the solution containing the coating polymer to sufficiently bring the fiber into contact with the solution even at the walls of the micropores in the surrounding wall of the fiber.

In the second place, the polymer is separated out of the solution to be deposited on the porous hollow fiber by addition of water to the solution. Alternatively, the fiber is simply taken out of the solution and dried in atmospheric condition for depositing the coating polymer on the fiber. These processes can be utilized in combination for depositing the coating polymer on the fiber. The fiber is then washed sufficiently with water to prepare a porous hollow fiber of the invention.

In the preparation of a porous hollow fiber of the invention, various conditions such as concentration of a solution of polymer and concentration gradient of the solution within the micropores in the surrounding wall are appropriately selected so as to prepare a porous hollow fiber coated on the walls of the micropores with an extremely thin layer of the coating polymer. The concentration gradient of the polymer solution can be formed, for instance, by a procedure of dipping the fiber at least twice in the solutions having different concentrations. In order to obtain a desired porous hollow fiber having the above-mentioned structure, there may be performed at plural times the aforementioned process comprising steps of dipping the fiber in the solution, separating out the polymer from the solution, washing the fiber with water, and drying the fiber. By appropriately selecting the above-mentioned conditions and processing periods, there can be obtained a variety of porous hollow fibers such as a fiber having almost the same inner diameter as the initial diameter, a fiber having a non-porous layer on at least one of the outer and inner surfaces of the surrounding wall, or a fiber having the micropores filled up with the coating polymer.

The porous hollow fiber prepared as above shows satisfactory hydrophilic nature.

The structure of the porous hollow fiber according to the invention is described more in detail referring to FIGS. 1 to 4.

Figure 1:
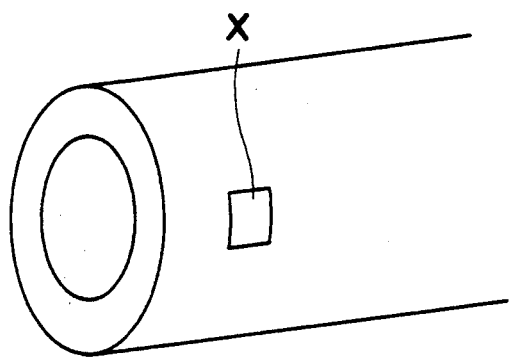
FIG. 1 is a perspective view of a porous hollow fiber according to the present invention.

FIG. 1 is a perspective view of a porous hollow fiber of the invention.

Figure 2:
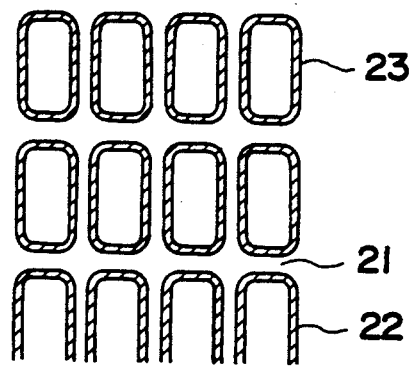
FIG. 2 is an enlarged view of the area (marked with X in FIG. 1) on the outer surface of the surrounding wall of one example of the porous hollow fiber according to the present invention.

Each of FIGS. 2 to 4 is an enlarged view of the area (marked with X in FIG. 1) on the outer surface of the sorrounding wall of examples of the porous hollow fiber according to the present invention.

As shown in FIG. 2, an outer surface 21 of the sorrounding wall of the porous hollow fiber has a large number of micropores 22. The walls of the micropores 22 are coated with a layer of the polymer 23. The layer of the polymer may be provided on the whole surface of the outer surface of the sorrounding wall of the porous hollow fiber.

FIG. 3 shows an outer surface 31 of the sorrounding wall of the porous hollow fiber having different structure from that of the fiber shown in FIG. 2. The walls of the micropores 32 are coated with a layer of the polymer 33. Further, the inner surface of the surrounding wall is coated with a non-porous layer of the polymer 34. The layer of the polymer may be provided on the whole surface of the outer surface of the sorrounding wall of the porous hollow fiber.

FIG. 4 shows a porous hollow fiber in which the micropores 42 are filled up or blocked up with the polymer 43. The layer of the polymer may be provided on the whole surface of the outer surface of the sorrounding wall of the porous hollow fiber.

The present invention will be illustrated by the following examples, but these examples by no means are construed to restrict the invention.

EXAMPLE 1

Polypropylene (UBE-PP-J109G, trade name, available from Ube Industries, Ltd., MFI=9 g/10 min.) was spun using a nozzle made for producing hollow fibers, which was equipped with a gas supplier tube of the diameter of 33 mm and inner diameter of 27 mm, under the conditions of the spinning temperature at 200° C. and take-up speed of 116 m/min. The obtained polypropylene hollow fiber was heat-treated for 6 minutes in an air bath heated to 145° C., and then the fiber was drawn in liquid nitrogen (at −195° C.) to give a length of 120% based on the initial length. Subsequently, the drawn fiber was placed under the tension in the air bath heated at 145° C. for 2 minutes.

Thus treated hollow fiber was again drawn in an air atmosphere at a temperature of 125° C. to give a length of 400% based on the initial length. Then the drawn fiber was placed under the tension in the air bath heated at 145° C. for 15 minutes to obtain a porous polypropylene hollow fiber.

The average pore diameter and void ratio measured by a mercury porosimeter (POROSIMETRO SERIES 1500 produced by CARLOERBA Corp., Italy) were 0.32 $\mu$m and 75.2%, respectively.

In the porous polypropylene hollow fiber obtained as above, it was observed by the use of an electron microscope that a large number of micropores having a relatively large size were formed uniformly in the surrounding wall and those micropores had almost the same pore size as each other.

The outer diameter and inner diameter of the porous polypropylene hollow fiber were 400 $\mu$m and 300 $\mu$m, respectively.

Independently, ethylcellulose (ETHOCEL STD PREMIUM produced by Dow Chemical, viscosity at 25° C. in a mixture of 80 vol.% of toluene and 20 vol.% of ethanol containing 5 wt.% of the ethylcellulose: 7 cps, ethoxy group content: 48–49.5%) was dissolved in acetone to give a 0.35 wt.% ethylcellulose solution.

The porous polypropylene hollow fiber was dipped in the ethylcellulose solution, and then taken out of the solution. The fiber was air-dried to remove the solvent from the inner spaces of the pores of the fiber. The fiber was then dipped in water to deposit ethylcellulose on the fiber, washed with water, and then dried.

The porous hollow fiber was observed on the outer and inner surfaces of the surrounding wall and the sectional portion of the surrounding wall by electron microscope. As a result, it was confirmed that a large number of micropores having almost the same size as that of the porous hollow fiber prior to the treatment with the ethylcellulose were substantially kept in the surrounding wall of the porous hollow fiber without being filled up with the ethylcellulose.

The above porous hollow fiber was measured on the amount of water permeation when water was filtered without being subjected to pretreatment with alcohol. The amount of water permeation was 35 l/min.m$^2$.atm.

COMPARISON EXAMPLE 1

The same porous polypropylene hollow fiber as in Example 1 except that the treatment with ethylcellulose and pretreatment with alcohol were both omitted was subjected to test for measuring permeation of water at 1.5 kg/cm$^2$. No water permeated through wall of the fiber.

The porous polypropylene hollow fiber was subjected to hydrophilic treatment using alcohol, and then water was filtered using the fiber. The amount of water permeation was 20 l/min.m$^2$.atm.

EXAMPLE 2

The procedure of Example 1 was repeated except for repeating one more time the process comprising steps of dipping the porous hollow fiber obtained in Example 1 in the ethylcellulose solution, taking the fiber out of the solution, air-drying the fiber to deposit ethylcellulose on the fiber, washing the fiber with water, and drying the washed fiber, to prepare a treated porous hollow fiber.

The porous hollow fiber was observed on the outer and inner surfaces of the surrounding wall and the sectional portion of the surrounding wall by an electron microscope. As a result, it was confirmed that a large number of micropores having almost the same size as that of the porous hollow fiber prior to the treatment with ethylcellulose were substantially kept on the outer surface of the surrounding wall. On the inner surface of the surrounding wall of the porous hollow fiber was formed a non-porous layer of ethylcellulose.

The porous hollow fiber with no pretreatment with alcohol was measured on the amount of water permeation. The amount of water permeation was 0.1 l/min.m$^2$.atm. Further, when physiological saline containing 0.1% of albumin was filtered using the porous hollow fiber, it was confirmed that albumin never passed through the fiber wall.

EXAMPLE 3

The procedure of Example 1 for the preparation of a porous polypropylene hollow fiber was repeated except that the drawing at 125° C. was changed to the drawing at 128° C. The average pore diameter and void ratio measured by the mercury porosimeter were 0.35 $\mu$m and 75%, respectively.

In the porous polypropylene hollow fiber obtained as above, it was observed by the use of an electron microscope that a large number of micropores having a relatively large size were formed uniformly in the surrounding wall and those micropores had almost the same pore size as each other.

The outer diameter and inner diameter of the porous polypropylene hollow fiber were 400 $\mu$m and 300 $\mu$m, respectively.

Independently, carboxymethylethylcellulose (CMEC OS-type, produced by Kojin Co., Ltd., Japan) was dissolved in a mixture of ethanol and water (ethanol:water=85:15, volume ratio) to give a 1.6 wt. % carboxymethylethylcellulose solution.

The porous polypropylene hollow fiber was dipped in the carboxymethylethylcellulose solution, and then taken out of the solution. The fiber was air-dried to remove the solvent from the inner spaces of the pores of the fiber. The fiber was then dipped in water to deposit carboxymethylethylcellulose on the fiber, washed with water, and then dried.

The porous hollow fiber was observed on the outer and inner surfaces of the surrounding wall and the sectional portion of the surrounding wall by electron microscope. As a result, it was confirmed that a large number of micropores having almost the same size as that of the porous hollow fiber prior to the treatment with the carboxymethylethylcellulose were substantially kept in the surrounding wall of the porous hollow fiber without being filled up with the carboxymethylethylcellulose.

The above porous hollow fiber was measured on the amount of water permeation when water was filtered without being subjected to pretreatment with alcohol. The amount of water permeation was 16.7 l/min.m$^2$.atm.

COMPARISON EXAMPLE 2

The same porous polypropylene hollow fiber as in Example 3 except that the treatment with carboxymethylethylcellulose and pretreatment with alcohol were both omitted was subjected to test for measuring permeation of water at 1.5 kg/cm$^2$. No water permeated through wall of the fiber.

The porous polypropylene hollow fiber was subjected to hydrophilic treatment using alcohol, and then water was filtered using the fiber. The amount of water permeation was 22.3 l/min.m$^2$.atm.

EXAMPLE 4

The procedure of Example 3 was repeated except for using a 3.0 wt. % carboxymethylethylcellulose solution in a mixture of ethanol and water (ethanol:water=85:15, volume ratio) and the deposition of carboxymethlethylcellulose was made by complete air-drying.

The porous hollow fiber was observed on the outer and inner surfaces of the surrounding wall and the sectional portion of the surrounding wall by an electron microscope. As a result, it was confirmed that a large number of micropores having almost the same size as that of the porous hollow fiber prior to the treatment with carboxymethylethylcellulose were substantially kept on the outer surface of the surrounding wall. On the inner surface of the surrounding wall of the porous hollow fiber was formed a non-porous layer of carboxymethylethylcellulose.

The porous hollow fiber with no pretreatment with alcohol was measured on the amount of water permeation. The amount of water permeation was 0.09 l/min.m$^2$.atm. Further, when physiological saline containing 0.1% of albumin was filtered using the porous hollow fiber, it was confirmed that albumin never passed through the fiber wall.

EXAMPLE 5

The procedure of Example 1 for the preparation of a porous polypropylene hollow fiber was repeated except that the drawing at 125° C. was changed to the drawing at 130° C. The average pore diameter and void ratio measured by the mercury porosimeter were 0.37 $\mu$m and 74% respectively.

In the porous polyproylene hollow fiber obtained as above, it was observed by the use of an electron microscope that a large number of micropores having a relatively large size were formed uniformly in the surrounding wall and those micropores had almost the same pore size as each other.

The outer diameter and inner diameter of the porous polypropylene hollow fiber were 400 $\mu$m and 300 $\mu$m, respectively.

Independently, poly(2-hydroxyethyl methacrylate) (produced by Janssen Chimica, Belgium) was dissolved in methanol to give 1.5 wt. % poly(2-hydroxyethyl methacrylate) solution.

The porous polypropylene hollow fiber was dipped in the poly(2-hydroxyethyl methacrylate) solution, and then taken out of the solution. The fiber was air-dried to remove the solvent from the inner spaces of the pores of the fiber. The fiber was then dipped in water to deposit poly(2-hydroxyethyl methacrylate) on the fiber, washed with water, and then dried.

The porous hollow fiber was observed on the outer and inner surfaces of the surrounding wall and the sectional portion of the surrounding wall by electron microscope. As a result, it was confirmed that a large number of micropores having almost the same size as that of the porous hollow fiber prior to the treatment with the poly(2-hydroxyethyl methacrylate) were substantially kept in the surrounding wall of the porous hollow fiber without being filled up with poly(2-hydroxyethyl methacrylate).

The above porous hollow fiber was measured on the amount of water permeation when water was filtered without being subjected to pretreatment with alcohol. The amount of water permeation was 15.3 l/min.m$^2$.atm.

COMPARISON EXAMPLE 3

The same porous polypropylene hollow fiber as in Example 5 except that the treatment with poly(2-hydroxyethyl methacrylate) and pretreatment with alcohol were both omitted was subjected to test for measuring permeation of water at 1.5 kg/cm$^2$. No water permeated through wall of the fiber.

The porous polypropylene hollow fiber was subjected to hydrophilic treatment using alcohol, and then water was filtered using the fiber. The amount of water permeation was 25.5 l/min.m$^2$.atm.

EXAMPLE 6

The procedure of Example 5 was repeated except for using 3.0 wt. % poly(2-hydroxyethyl methacrylate) solution in methanol and the deposition of poly(2-hydroxyethyl methacrylate) was made by complete air-drying.

The porous hollow fiber was observed on the outer and inner surfaces of the surrounding wall and the sectional portion of the surrounding wall by an electron microscope. As a result, it was confirmed that a large number of micropores having almost the same size as that of the porous hollow fiber prior to the treatment with poly(2-hydroxyethyl methacrylate) were substantially kept on the outer surface of the surrounding wall. On the inner surface of the surrounding wall of the porous hollow fiber was formed a non-porous layer of poly(2-hydroxyethyl methacrylate).

The porous hollow fiber with no pretreatment with alcohol was measured on the amount of water pertreatment with alcohol was measured on the amount of water permeation. The amount of water permeation was 0.10 l/min.m$^2$.atm. Further, when physiological saline containing 0.1% of albumin was filtered using the porous hollow fiber, it was confirmed that albumin never passed through the fiber wall.

EXAMPLE 7

Hydroxypropylmethylcellulose acetate succinate (HPMCAS, AS-HG, produced by Shinetsu Chemical Industry, Co., Ltd., Japan) was dissolved in a mixture of acetone and water (acetone:water=95:5, volume ratio) to give a 0.3 wt. % hydroxypropylmethylcellulose acetate succinate solution.

The porous polypropylene hollow fiber prepared in Example 1 was dipped in the cellulose derivative solution, and then taken out of the solution. The fiber was air-dried to remove the solvent from the inner spaces of the pores of the fiber. The fiber was then dipped in water to deposit the cellulose derivative on the fiber, washed with water, and then dried.

The porous hollow fiber was observed on the outer and inner surfaces of the surrounding wall and the sectional portion of the surrounding wall by electron microscope. As a result, it was confirmed that a large number of micropores having almost the same size as that of the porous hollow fiber prior to the treatment with the cellulose derivative were substantially kept in the surrounding wall of the porous hollow fiber without being filled up with the cellulose derivative.

The above porous hollow fiber was measured on the amount of water permeation when water was filtered without being subjected to pretreatment with alcohol. The amount of water permeation was 28.5 l/min.m$^2$.atm.

COMPARISON EXAMPLE 4

The same porous polypropylene hollow fiber as in Example 7 except that the treatment with the cellulose derivative and pretreatment with alcohol were both omitted was subjected to test for measuring permeation of water at 1.5 kg/cm$^2$. No water permeated through wall of the fiber.

EXAMPLE 8

The procedure of Example 7 was repeated except for using a 3.0 wt. % hydroxypropylmethylcellulose acetate succinate solution in a mixture of acetone and water (acetone:water=95:5, volume ratio) and the deposition of the cellulose derivative was made by complete air-drying.

The porous hollow fiber was observed on the outer and inner surfaces of the surrounding wall and the sectional portion of the surrounding wall by an electron microscope. As a result, it was confirmed that a large number of micropores having almost the same size as that of the porous hollow fiber prior to the treatment with thw cellulose derivative were substantially kept on the outer surface of the surrounding wall. On the inner surface of the surrounding wall of the porous hollow fiber was formed a non-porous layer of the cellulose derivative.

The porous hollow fiber with no pretreatment with alcohol was measured on the amount of water permeation. The amount of water permeation was 0.09 l/min.m$^2$.atm. Further, when physiological saline containing 0.1% of albumin was filtered using the porous hollow fiber, it was confirmed that albumin never passed through the fiber wall.

EXAMPLE 9

Hydroxypropylmethylcellulose phthalate (HP-50, produced by Shinetsu Chemical Industry, Co., Ltd., Japan) was dissolved in a mixture of acetone and water (acetone: water=95:5, volume ratio) to give 2 wt.% hydroxypropylmethylcellulose acetate phthalte.

The porous polypropylene hollow fiber prepared in Example 3 was dipped in the cellulose derivative solution, and then taken out of the solution. The fiber was air-dried to remove the solvent from the inner spaces of the pores of the fiber. The fiber was then dipped in water to deposit the cellulose derivative on the fiber, washed with water, and then dried.

The porous hollow fiber was observed on the outer and inner surfaces of the surrounding wall and the sectional portion of the surrounding wall by electron microscope. As a result, it was confirmed that a large number of micropores having almost the same size as that of the porous hollow fiber prior to the treatment with the cellulose derivative were substantially kept in the surrounding wall of the porous hollow fiber without being filled up with the cellulose derivative.

The above porous hollow fiber was measured on the amount of water permeation when water was filtered without being subjected to pretreatment with alcohol. The amount of water permeation was 51.3 l/min.m$^2$.atm.

COMPARISON EXAMPLE 5

The same porous polypropylene hollow fiber as in Example 9 except that the treatment with the cellulose derivative and pretreatment with alcohol were both omitted was subjected to test for measuring permeation of water at 1.5 kg/cm$^2$. No water permeated through wall of the fiber.

EXAMPLE 10

The procedure of Example 9 was repeated except for using a 3.0 wt.% hydroxypropylmethylcellulose phthalate solution in a mixture of acetone and water (acetone:- water =95:5, volume ratio) and the deposition of the cellulose derivative was made by complete air-drying.

The porous hollow fiber was observed on the outer and inner surfaces of the surrounding wall and the sectional portion of the surrounding wall by an electron microscope. As a result, it was confirmed that a large number of micropores having almost the same size as that of the porous hollow fiber prior to the treatment with carboxymethylethylcellulose were substantially kept on the outer surface of the surrounding wall. On the inner surface of the surrounding wall of the porous hollow fiber was formed a non-porous layer of the cellulose derivative.

The porous hollow fiber with no pretreatment with alcohol was measured on the amount of water permeation. The amount of water permeation was 0.12 l/min.m$^2$.atm. Further, when physiological saline containing 0.1% of albumin was filtered using the porous hollow fiber, it was confirmed that albumin never passed through the fiber wall.

What is claimed is:

1. In a porous hollow polypropylene fiber having a large number of micropores in its surrounding wall, the improvment in which walls of said pores are coated with an essentially water-insoluble polymer selected from the group consisting of, carboxymethylethylcellulose, hydroxypropylmethylcellulose acetate succinate and hydropropylmethylcellulose phthalate.

2. The porous hollow fiber as claimed in claim 1, wherein outer and inner surfaces of the surrounding wall are further coated with said polymer.

3. The porous hollow fiber as claimed in claim 1, wherein at least one of outer and inner surfaces of the surrounding wall is coated with a non-porous layer of said polymer.

4. The porous hollow fiber as claimed in claim 1, wherein said micropores in the surrounding wall are filled up with said polymer.

5. The porous hollow fiber as claimed in claim 1, wherein said polymer is hydroxypropylmethylcellulose acetate succinate having substituents comprising 12-28 mol.% of methoxyl group, 4-23 mol.% of hydroxypropoxyl group, 2-16 mol.% of acetyl group and 4-28 mol.% of succinoyl group.

6. The porous hollow fiber as claimed in claim 1, wherein said polymer is carboxymethylethylcellulose containing 8.9-14.9 wt.% of carboxymethyl group and 32.5-43.0 wt.% of ethoxyl group.

7. The porous hollow fiber as claimed in claim 1, wherein said polymer is hydroxypropylmethylcellulose phthalate having substituents comprising 18-24 mol.% of methoxyl group, 5-10 mol.% of hydroxypropoxyl group, and 21-35 mol.% of carboxybenzoyl group.

* * * * *